(12) United States Patent
Jeong

(10) Patent No.: US 7,661,144 B2
(45) Date of Patent: *Feb. 9, 2010

(54) APPARATUS AND METHOD FOR MOVING CONTENTS HAVING A RESTRICTED NUMBER OF COPIES BETWEEN STORAGE MEDIA

(75) Inventor: Jae Yoon Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 901 days.

This patent is subject to a terminal disclaimer.

(21) Appl. No.: 11/228,359

(22) Filed: Sep. 19, 2005

(65) Prior Publication Data

US 2006/0015694 A1 Jan. 19, 2006

Related U.S. Application Data

(63) Continuation of application No. 10/022,889, filed on Dec. 20, 2001, now Pat. No. 6,965,975.

(30) Foreign Application Priority Data

Mar. 31, 2001 (KR) ................................ 2001-17207
Mar. 31, 2001 (KR) ................................ 2001-17208

(51) Int. Cl.
*G06F 7/00* (2006.01)
*G06F 21/00* (2006.01)

(52) U.S. Cl. ............................ 726/26; 726/31; 705/51; 705/57

(58) Field of Classification Search ............. 726/30–31; 705/57
See application file for complete search history.

(56) References Cited

U.S. PATENT DOCUMENTS 5,327,556 A * 7/1994 Mohan et al. .................. 707/8
5,347,579 A * 9/1994 Blandford .................... 713/176

(Continued)

FOREIGN PATENT DOCUMENTS

JP 11086437 A 3/1999

(Continued)

OTHER PUBLICATIONS

Unknown author, "SDMI Portable Device Specification, Part 1, Version 1.0", Jul. 8, 1999, 35 pages.*

(Continued)

*Primary Examiner*—Ponnoreay Pich
(74) *Attorney, Agent, or Firm*—Birch, Stewart, Kolasch & Birch, LLP

(57) ABSTRACT

A method of managing content, the method being performed by a device including an analyzing unit and a control unit. The method includes judging, via the analyzing unit, whether the content can be moved to an external entity based on moving control information, the moving control information being different from copy control information indicating whether the copy of the content is permitted, determining whether an authentication with the external entity is needed in order to move the content to the external entity, if the judging step judges that the content can be moved, and controlling, via the control unit, a moving operation of the content to the external entity such that the content can be moved to the external entity without the authentication if the determining step determines the authentication is not needed.

9 Claims, 7 Drawing Sheets

U.S. PATENT DOCUMENTS

| | | | |
|---|---|---|---|
| 5,629,980 A * | 5/1997 | Stefik et al. ............... 705/54 |
| 5,680,580 A * | 10/1997 | Beardsley et al. ............ 714/6 |
| 5,715,403 A * | 2/1998 | Stefik ........................ 705/44 |
| 6,035,418 A * | 3/2000 | Recio et al. ................ 714/18 |
| 6,047,103 A * | 4/2000 | Yamauchi et al. ............ 386/94 |
| 6,069,952 A * | 5/2000 | Saito et al. .................. 705/57 |
| 6,236,971 B1 * | 5/2001 | Stefik et al. .................. 705/1 |
| 6,282,573 B1 * | 8/2001 | Darago et al. ............ 709/229 |
| 6,314,518 B1 * | 11/2001 | Linnartz .................... 713/631 |
| 6,578,149 B1 | 6/2003 | Kawamae et al. |
| 6,601,046 B1 * | 7/2003 | Epstein ........................ 705/57 |
| 6,603,576 B1 | 8/2003 | Nakamura et al. |
| 6,615,192 B1 * | 9/2003 | Tagawa et al. ............... 705/57 |
| 6,636,953 B2 | 10/2003 | Yuasa et al. |
| 6,684,210 B1 * | 1/2004 | Takechi et al. ................ 707/9 |
| 6,700,989 B1 | 3/2004 | Itoh et al. |
| 6,807,534 B1 * | 10/2004 | Erickson ...................... 705/51 |
| 6,834,349 B1 | 12/2004 | Higurashi et al. |
| 6,847,950 B1 * | 1/2005 | Kamibayashi et al. ........ 705/57 |
| 7,032,059 B1 * | 4/2006 | Yamada et al. ............ 710/313 |
| 7,096,504 B1 * | 8/2006 | Tagawa et al. ................ 726/27 |
| 7,218,736 B1 * | 5/2007 | Nishimura et al. .......... 380/201 |
| 7,245,702 B1 * | 7/2007 | Mahaney ................ 379/15.01 |
| 7,251,729 B1 * | 7/2007 | Park ........................... 713/168 |
| 2001/0012440 A1 * | 8/2001 | Itoi .............................. 386/94 |
| 2001/0042043 A1 * | 11/2001 | Shear et al. ................... 705/51 |
| 2002/0156742 A1 | 10/2002 | Ogino et al. |

FOREIGN PATENT DOCUMENTS

| | | | |
|---|---|---|---|
| JP | 2000-149417 A | 5/2000 |
| JP | 2000-200475 A | 7/2000 |
| JP | 2000-311114 A | 11/2000 |
| JP | 2000-330870 A | 11/2000 |
| JP | 2000-353361 A | 12/2000 |
| JP | 2000-357201 A | 12/2000 |
| JP | 2001-084694 A | 3/2001 |
| WO | WO-97/14249 A1 | 4/1997 |
| WO | WO 9952035 A1 * | 10/1999 |

OTHER PUBLICATIONS

Unkown author, "ContentGuard—Intellectual Property", 8 pages, Nov. 4, 2009.*

Unknown author, "Digital Rights Management Standards News From DRM Watch", 3 pages, printed on Nov. 10, 2009.*

Unknown author, "JSR-000300 DRM API for Java", 2 pages, printed on Nov. 10, 2009.*

Faultline, "LG is next major to take a licence to Intertrust DRM", 4 pages, Mar. 30, 2007.*

Unknown author, "Open Mobile Alliance Distinguishes Itself From DRM Patent Pool", 3 pages, printed: Nov. 10, 2009.*

Postel et al, "File Transfer Protocol (FTP)", 69 pages, Oct. 1985.*

Unknown author, "The Latest on DRM Technologies From DRM Watch", 3 pages, printed: Nov. 10, 2009.*

Unknown author, "WIPO—Search National Patent and PCT Collections", 3 pages, printed: Nov. 10, 2009.*

Taku et al., "IEEE 1394 Content Protection System", Toshiba Review, vol. 54, No. 7, pp. 34-37, 1999, Published by Toshiba Corporation.

* cited by examiner

APPARATUS AND METHOD FOR MOVING CONTENTS HAVING A RESTRICTED NUMBER OF COPIES BETWEEN STORAGE MEDIA

This application is a Continuation of application Ser. No. 10/022,889, filed on Dec. 20, 2001 now U.S. Pat. No. 6,965,975, the entire contents of which are hereby incorporated by reference and for which priority is claimed under 35 U.S.C. §120.

BACKGROUND OF THE INVENTION

1. Field of the Invention

The present invention relates to an apparatus and method for moving contents, particularly, to an apparatus and method for moving contents capable of moving contents having a restricted number of copies to another storage media.

2. Description of the Background Art

Recently, due to a rapid; growth of computer and communication technologies, information and communication have become more important in everyday life as well as in science and business. Particularly, in the current information age, since every country in the world is constructing high-speed communications networks, various information will be provided, transmitted and consumed and a considerable part of such information will be secured by copyright laws.

Recorders, video recorders and copy machines using the analog method make differences in quality between the original and the copy in costs, time and convenience, and accordingly, those things do not significantly affect the copyright.

However, work on information and communication media such as the Internet significantly affect copyright laws since the copy and the original are 100% identical and through the Internet images and voices as well as texts can be transmitted to the entire world. Also, in the broadcasting field, the TV transmitting method is digitized by generalization of the digital compression technology and the development of inexpensive receivers, and accordingly, copying contents through broadcasting significantly affects copyright laws.

In the information age where all works such as images and records are digitized, infringement of copyright laws has become easy and is done in various forms, and accordingly, exposing and getting rid of infringement of copyright laws is difficult.

Therefore, since writing is decreased and distribution of intellectual property rights is hindered unless the infringement of intellectual properties is prevented or the technologies for exposing the infringement is prevented, enterprises related to copyrights are making significant efforts to develop copy protecting technology as a technological means to secure works.

In the present, as a general technology for protecting a copy, there is a method of restricting the number of copies to a certain number by inserting a copy control code in a header part of contents. The above technology will be applied to broadcasting contents as the digital broadcasting is popularized, and the technology is partly now in use.

FIG. 1 is a schematic block diagram showing a copy apparatus of a conventional digital broadcast receiver.

As shown in FIG. 1, the conventional digital broadcast receiver includes a TV broadcast receiver 100 for receiving contents which a broadcasting station transmits, and a recording apparatus 200 for storing the received contents.

The above TV broadcast receiver 100 includes a receiving unit 110 for receiving the contents, and a first storage medium 120 for storing the contents supplied from the receiving unit 110. Further, the recording apparatus 200 includes a second storage medium 210 for storing the contents transmitted from the first storage medium 120.

The operation of a copying apparatus for the conventional digital broadcasting receiver will be described with reference to accompanied drawings as follows.

The receiving unit 110 of a TV broadcasting receiver receives contents transmitted through transmission media such as a broadcast satellite or cable and stores the contents in the built-in first storage medium 120. At this time, the possible number of copies of the contents is decreased by one.

With the above storage method, the contents can be stored by the storage command of a user or new contents can be continuously stored by automatically deleting old contents at a certain time interval according to the composition of the TV broadcast receiver 100.

Later, when the user wants to copy the contents to the second storage medium, the TV broadcast receiver 100 reads the contents from the first storage medium and judges the possible number of copies by analyzing the copy control code inserted in the header part of the contents.

FIG. 3 is a view showing a packet including a header in accordance with a conventional data packet. A "DATA LENGTH" field specifies the length of the data field of a data block payload packets and data block packets; a "TAG" field provides a high-level label for the format of data carried by the packet; a "CHANNEL" field specifies the channel number for the packet; a "TCODE" field represents a transaction code, which specifies the packet format and the type of transaction to be performed; and an "SY" field represents a synchronization code, and is an application-specific control field.

At this time, as shown in FIG. 3, the copy control code uses 2 bits among 4 bits of synchronous bits in the header part of the data packet and is divided to an unrestricted copy, a restricted copy, a single copy and no copy according to the set values (00,01,10,11). Also, the other 1 bit is used in an encryption code of the data stream and the least significant bit of the synchronous bits is a reserved bit and is not used.

Namely, as shown in FIG. 2, if the copy control code is set as an unrestricted copy (S201), the TV broadcast receiver 100 does not convert the copy control code and copies the contents to the second storage medium (S202 and S203). If the copy control code is set as restricted copy (S204), the receiver 100 stores the contents in the second storage medium 210 after decreasing by one from the possible number of copies and by converting the copy control code (S205 and S206). On the contrary, if the copy control code is set as no copy, the TV broadcast receiver 100 cannot copy the contents to the second storage medium regardless of the demand of the user (S207).

By the way, the first storage medium 120 is restricted in capacity. Therefore, if the copy control code is set to no copy in case the user of the digital broadcast receiver is willing to store the contents for a long time or edit the contents, a copying or editing of the contents from the first storage medium 120 to the second storage medium 210 is impossible.

SUMMARY OF THE INVENTION

Therefore, an object of the present invention is to provide an apparatus and method for moving contents capable of moving the position of stored contents under the condition that the number of contents is not increased.

Another object of the present invention is to provide an apparatus and method for moving contents capable of efficiently moving contents having a restricted number of copies to another storage media.

To achieve these and other advantages and in accordance with the purpose of the present invention, as embodied and broadly described herein, there is provided an apparatus for moving contents comprising an input unit for inputting contents and a control unit for controlling the moving of the contents to another medium by analyzing a copy control code of the contents.

To achieve the above objects, there is provided a method for moving contents comprising the steps of analyzing a copy control code of the contents when a user selects moving of the contents from a first storage medium to a second storage medium and storing the contents the contents in the second storage medium by converting the copy control code of the contents according to the result of analysis.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
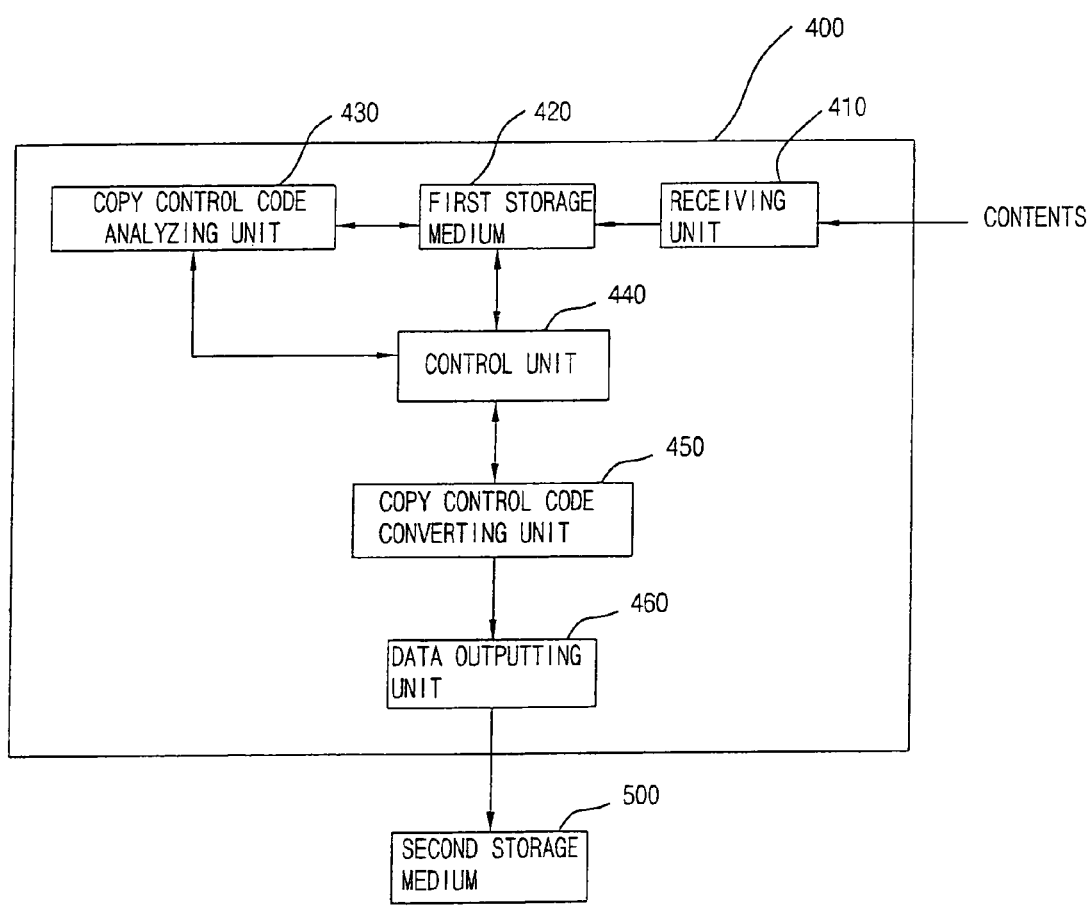
FIG. 4 is a block diagram showing an apparatus for moving contents in accordance with the present invention.

FIG. 4 is a block diagram showing an apparatus for moving contents in accordance with the present invention.

As shown in FIG. 4, an apparatus for moving contents in accordance with the present invention includes a TV broadcast receiver 400 for analyzing a copy control code of contents received from a broadcasting station, converting the copy control code according to the result of the analysis and outputting the converted code. Also included is a second storage medium 500 for storing the contents moved from the TV broadcast receiver 400 through an interface means.

The TV broadcast receiver 400 includes a receiving unit 410 for receiving the contents, a first storage medium 420 for temporarily storing the contents received from the receiving unit 410, a copy control code analyzing unit 430 for analyzing a copy control code of the contents stored in the first storage medium 320, a control unit 440 for controlling the operation of each unit needed to move the contents such as fetching, deleting and code converting from the first storage medium 420, a copy control code converting unit 450 for converting the copy control code of the contents according to the control of the control unit 440 and a data outputting unit 460 for transmitting contents fetched from the first storage medium having the converted copy control code to the second storage medium.

At this time, the second storage medium 500 can be included in the TV broadcast receiver 400, and can be independent out of the receiver using a connection means such as a cable or can be included in another apparatuses (for example, a VCR for performing recording).

Figure 5:
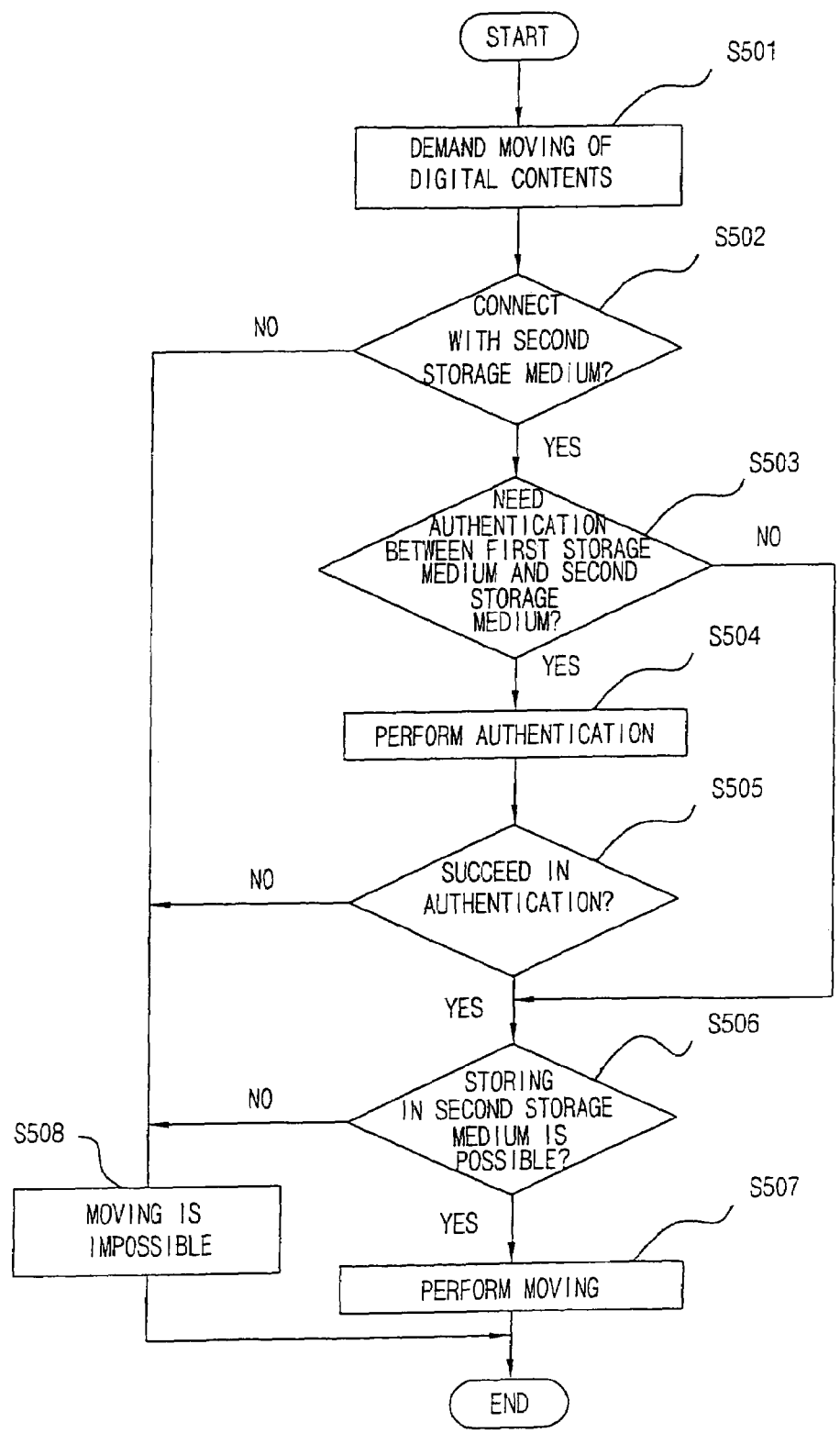
FIG. 5 is a flowing chart showing a method for moving contents in accordance with the present invention.

The operation of the apparatus for the moving the contents in accordance with the present invention will now be described with reference to FIGS. 5 and 6.

The receiving unit 410 of the TV broadcast receiver receives the contents transmitted through the media such as a broadcasting satellite or a cable and stores the contents in the first storage medium 420. At this time, the possible number of copies of the contents is decreased by one.

Later, when the user requests moving the contents, the control unit 440 checks whether the TV broadcast receiver and the second storage medium 500 are connected (S501 and S502). If they are connected, the control unit 440 judges whether an authentication is needed between the TV broadcast receiver 400 and the second storage unit 500 by analyzing the copy control code of the contents (S503).

Further, if the copy control code of contents is set as an unrestricted copy, the contents do not need any authentication. But if the copy control code of the contents is set as restricted copy or no copy, the contents are to be authenticated to maintain the restricted number of copies.

Therefore, the control unit 440 performs the step 506 when the copy control code is set as an unrestricted copy. However, when the copy control code is set as restricted copy or no copy, mutual authentication is performed between the TV broadcast receiver 400 and the second storage medium 500 (S504 and S505). At this time, since the TV broadcast receiver 400 and the second storage medium 500 are authenticated by each peculiar key values, in case a medium rejects the authentication demand or the authentication is not succeeded, moving the contents is not possible (S508).

When the authentication between the TV broadcast receiver 400 and the second storage medium 500 is performed successfully (Yes in S505), the control unit 440 controls the moving the contents stored in the first storage medium 420 to the second storage medium 500 only when the second storage medium 500 can be written to (S506 and S507).

Figure 6:
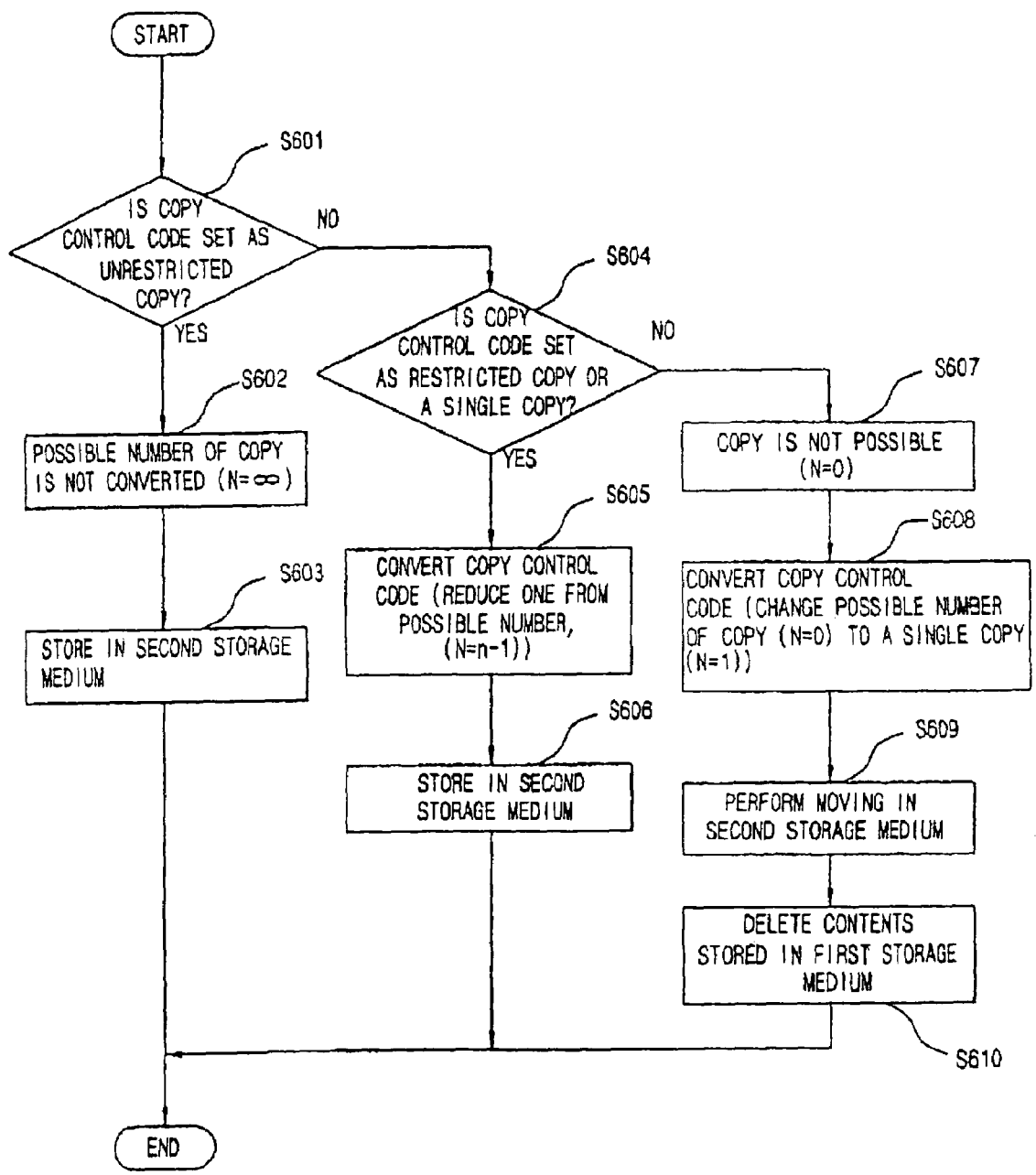
FIG. 6 is a detailed flowing chart showing the step for moving contents of FIG. 5.

FIG. 6 is a detailed flowing chart showing the step of moving the contents (S507).

As shown in FIG. 6, in the step of moving (S507), the moving operation is performed according to the possible number of copies determined by analyzing the copy control code inserted in the header part of the contents.

Namely, if the copy control code is set as an unrestricted copy (possible number of copy is N, N=∞), the copy control code is not converted by the copy control code converting unit 450 (S601 and S602). Later, the control unit 440 stores the above contents to the second storage medium 500 through the data outputting unit 460 (S603).

Also, if the copy control code is set as a restricted copy (N=n), the copy control code of the contents stored in the first storage medium 420 is decreased by one by the copy control code converting unit 450 (S604 and S605). The control unit 440 then stores the contents in the second storage medium 500 through the data outputting unit 450 (S606).

Also, if the copy control code is set as no copy (N=0), the copy control code of the contents stored in the first storage medium 420 is changed to a single copy by the copy control code converting unit 450 (S607 and S608) in order to move the contents from the first storage medium 420 to the second storage medium 500. Here, when the copy control code is set to no copy, the copy control code is set as a single copy or no copy before the contents are stored in the first storage medium 420. At this time, when the copy control code of the contents is set to no copy, this case is not included in the present invention, because the contents cannot be stored in the first storage medium 420. However, when the copy control code is set to no copy by being stored in the first storage medium 420, the present invention is applied to the case. Later, the control unit 440 stores the contents to the second storage medium 500 through the data outputting unit 460 and then moving the contents is completed by deleting the original written in the first storage medium 420 (S609 and S610).

Since the contents are moved as above, the number of the contents is same as that of before the movement.

As another embodiment from the above moving method, the present invention sets a moving determination bit in the contents in advance and accordingly, moving of the contents can be performed according to the moving determination bit.

Figure 7:
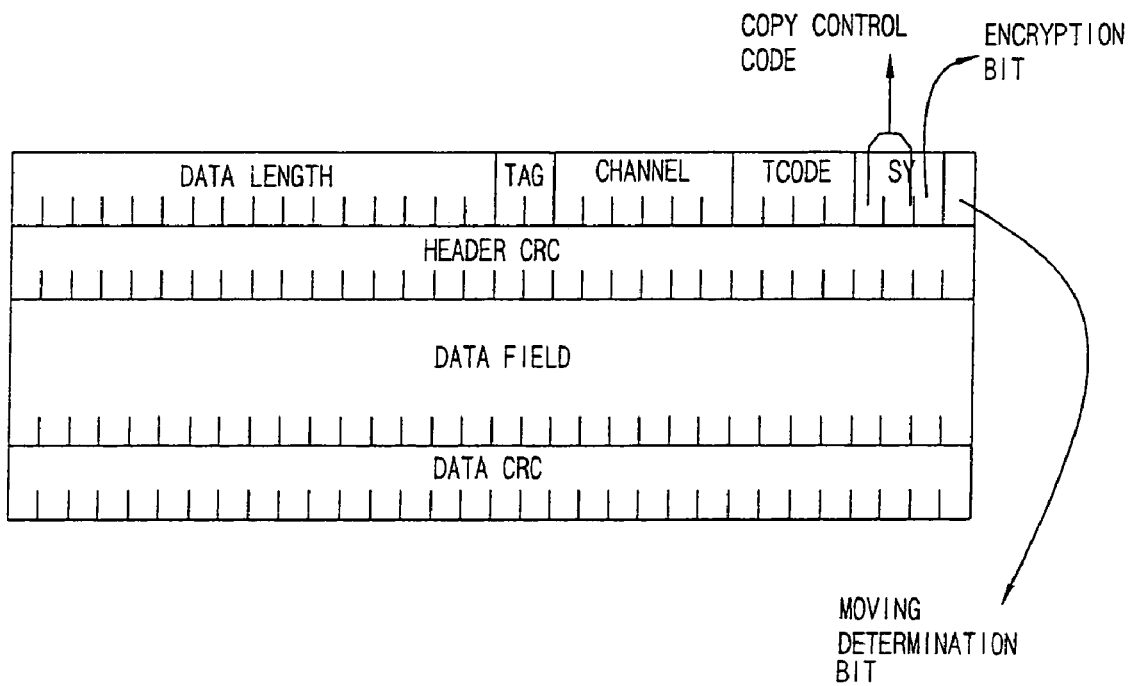
FIG. 7 is a view showing a header of the packet in accordance with the present invention.

Namely, as shown in FIG. 7, the present invention sets the least significant bit as a moving determination bit in the synchronous bits and if the contents can be moved, the moving determination bit is set as "1" and if the contents can not be moved, the moving determination bit is set as "0".

Therefore, if the user requests moving the contents to the second storage medium 500 after the contents are temporarily stored in the first storage medium 420 by being received in the receiving unit 410 of the TV broadcast receiver 400, the control unit 440 can judge whether or not the contents can be copied in advance according to the moving determination bit after reading the moving determination bit of the contents.

Figure 1:
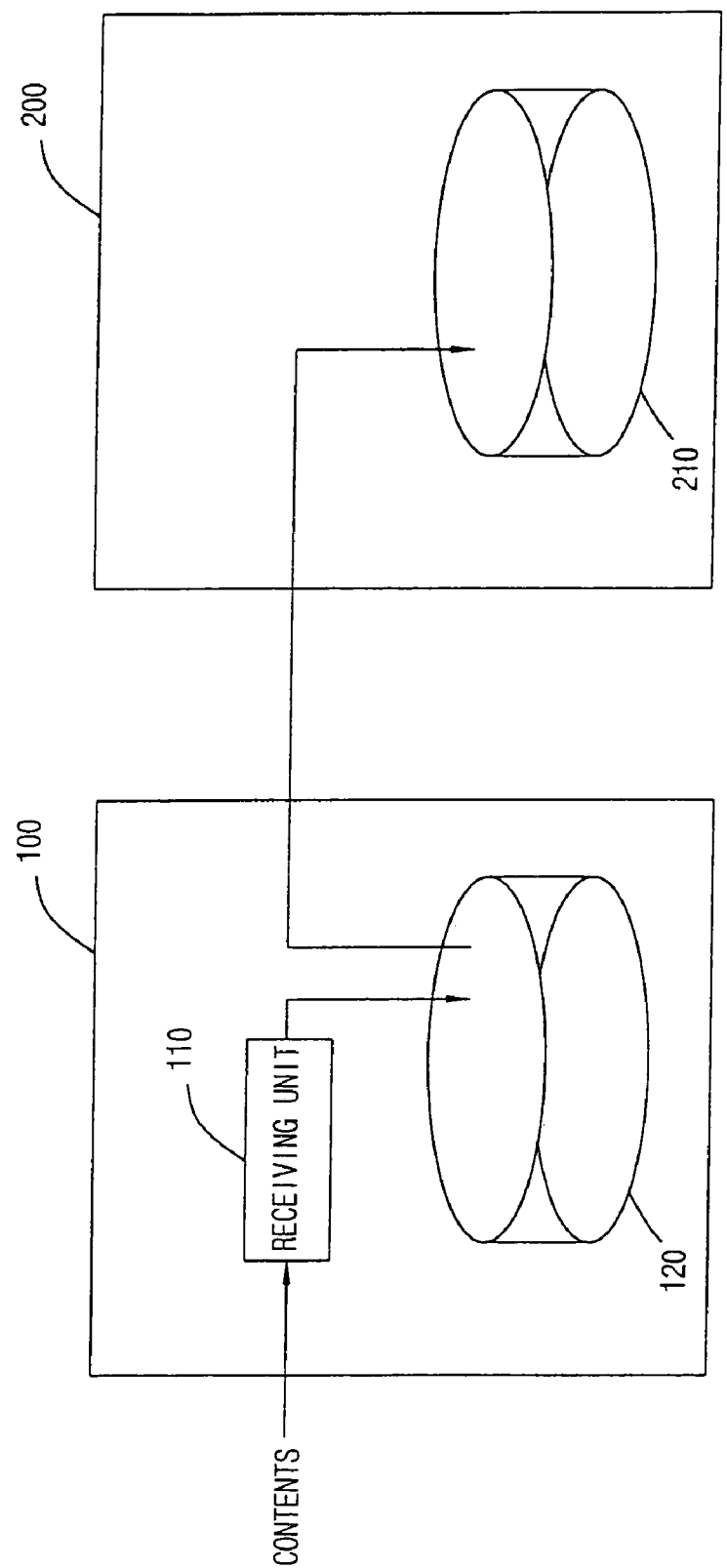
FIG. 1 is a schematic block diagram showing a conventional copy apparatus.
Figure 2:
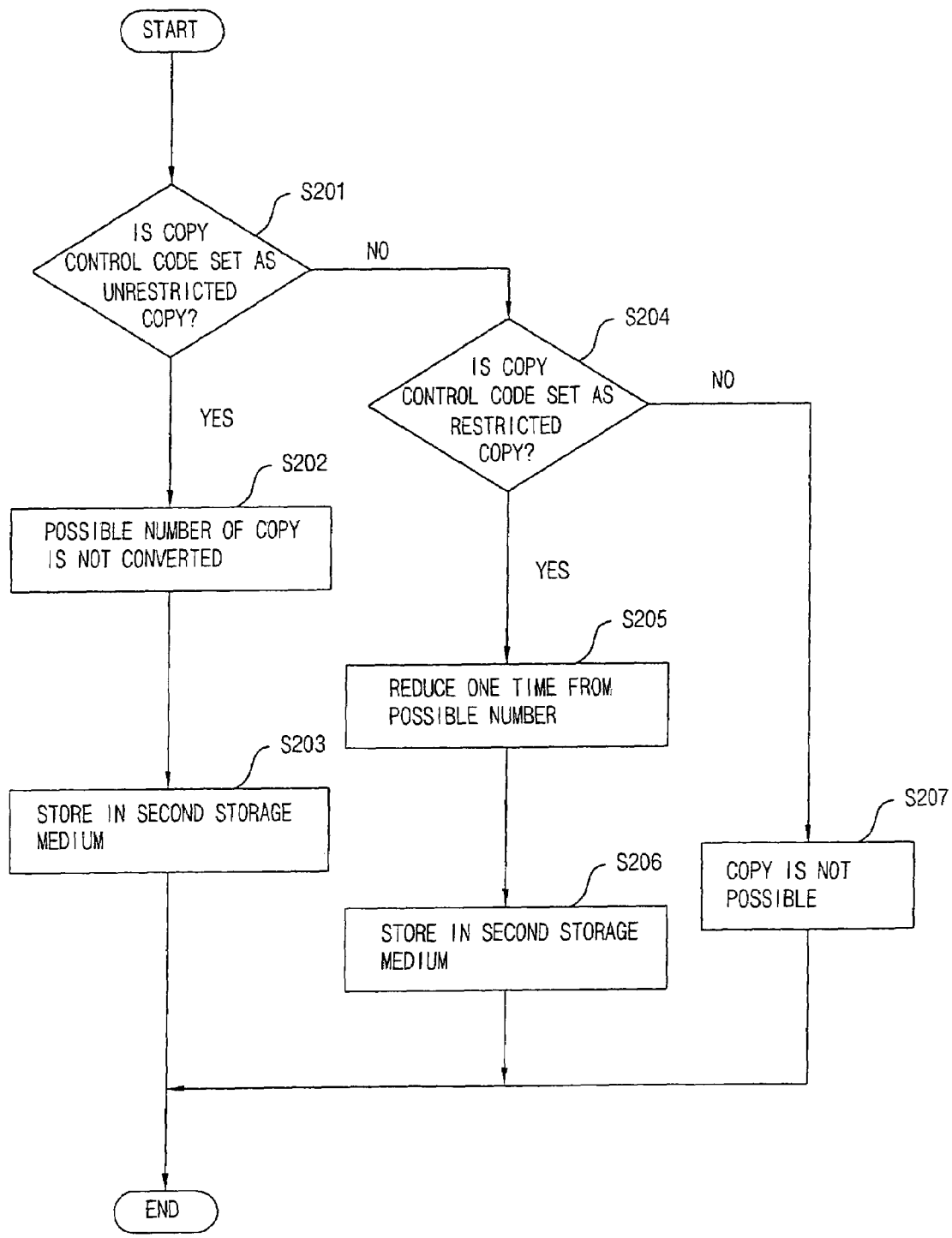
FIG. 2 is a flowing chart showing a method for copying contents of FIG. 1.
Figure 3:
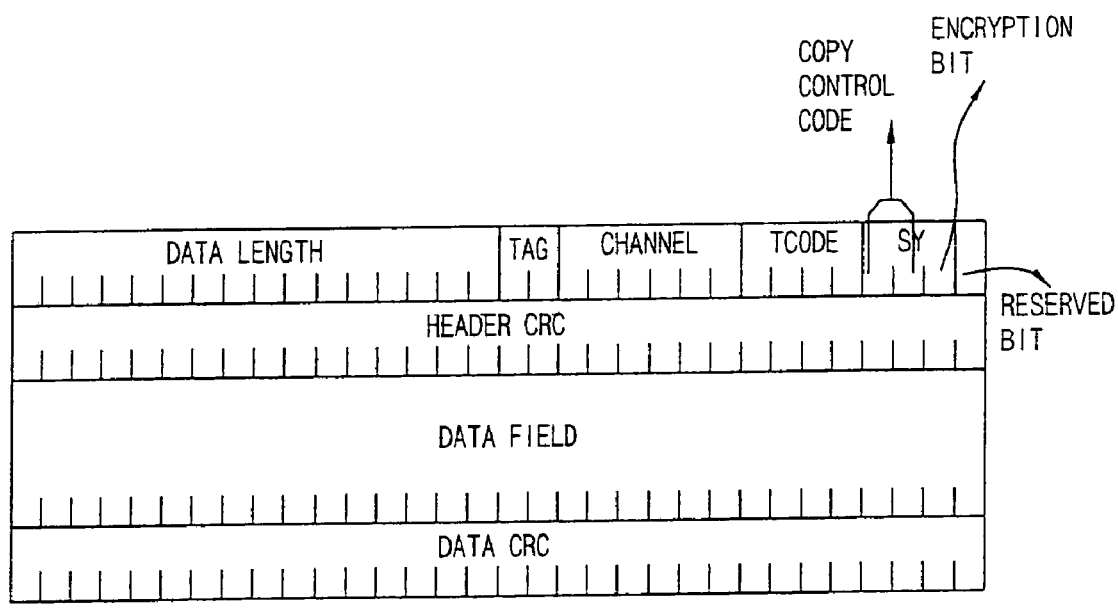
FIG. 3 is a view showing a header of a conventional data packet.

Namely, unless the moving determination bit is set as capable of being moved, the contents can not be moved to the second storage medium 500 and accordingly, the contents can be stored with the copy method as in FIG. 2 of the conventional art. However, if the moving determination bit is set as capable of being moved, the contents can be moved in the second storage medium 500 as in the process shown in FIGS. 5 and 6.

As another embodiment from the above TV broadcasting receiver 400, the present invention can be embodied as a processor (not shown) which includes units of the TV broadcasting receiver 400, or as a processor (not shown) which is programmed with the above method of moving contents.

The method of moving the contents is that the user moves the contents to the second storage medium 500 by analyzing and converting the copy control code of the contents after the contents are stored the first storage medium 420, as described above. However, the first storage medium 420 can be included in the Personal Video Recorder, and can be included in another apparatuses (for example, Personal Computer, Digital Video Disc, Digital Video Home System) using a connection means (for example, IEEE1394, Universal Serial Bus).

As described above, the apparatus and method for moving the contents can move the storing position of the contents and not increases the number of the contents.

As the present invention may be embodied in several forms without departing from the spirit or essential characteristics thereof, it should also be understood that the above-described embodiments are not restricted by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method of managing content, the method being performed by a device including an analyzing unit and a control unit, the method comprising:
   judging, via the analyzing unit, whether the content can be moved to an external entity based on moving control information, the moving control information being different from copy control information indicating whether or not a copy of the content is permitted;
   determining, via the analyzing unit, whether a communication is possible with the external entity through an interface, if the judging step determines the content can be moved, and determining whether an authentication with the external entity is needed in order to move the content to the external entity, if the judging step judges that the content can be moved and the analyzing unit determines the communication is possible; and
   controlling, via the control unit, a moving operation of the content to the external entity such that the content is moved to the external entity without the authentication if the determining step determines the authentication is not needed.

2. The method of claim 1, wherein the external entity is connected to the device through an IEEE 1394 or Universal Serial Bus.

3. The method of claim 1, wherein the controlling step comprises:
   checking whether the external entity can store the content before moving the content; and
   controlling the moving operation based on a result of the checking step.

4. The method of claim 3, wherein the controlling the moving operation based on the result of the checking step comprises:
   controlling the moving operation such that the content is not moved to the external entity if the checking step determines the external entity can not store the content, and controlling the moving operation such that the content is moved to the external entity if the checking step determines the external entity can store the content.

5. The method of claim 1, wherein the controlling step comprises:
   controlling the moving operation such that the content is moved to the external entity when the content can be stored in a storage medium of the external entity.

6. The method of claim 1, wherein the authentication is performed using a particular key value.

7. The method of claim 1, further comprising:
   deleting the content stored in a storage medium of the device if the content is moved to the external entity.

8. The method of claim 1, wherein the controlling step comprises:
   controlling the moving operation such that the content is moved to the external entity only when the determining step determines the authentication is successful.

9. The method of claim 1, wherein the content comprises at least one packet, and
   wherein the moving control information is included in a header of the at least one packet.

* * * * *